UNITED STATES PATENT OFFICE 2,534,121

AMINE ADDITION SALTS OF STEROID-3-MONOSULFATES

Gordon Allison Grant, Montreal, Quebec, William Lawrence Glen, Baie d'Urfe, Quebec, and Richard James Barber, Ville St. Laurent, Quebec, Canada, assignors to Ayerst, McKenna & Harrison, Limited, Ville St. Laurent, Quebec, Canada, a corporation of Canada No Drawing. Application May 19, 1950, Serial No. 163,098. In Canada May 6, 1950

13 Claims. (Cl. 260—397.4)

The present invention relates to new therapeutically useful steroid compounds and to their preparation.

More particularly it relates to the new stable salts of 1-phenyl-propane derivatives having a basic substituent in position-2 and possessing central stimulating activity with therapeutically active steroid 3-monosulphates.

The new stable addition salts of the present invention correspond to the general formula:

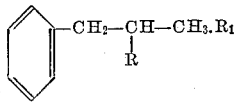

wherein R is selected from the group consisting of amino and alkyl amino and $R_1$ is a 3-monosulphate of the cyclopentanopolyhydrophenanthrene series possessing therapeutic properties. The preferred 3-monosulphates are for example, oestrone 3-monosulphate, equilin 3-monosulphate, equilenin 3-monosulphate, α-oestradiol 3-monosulphate, β-oestradiol 3-monosulphate, pregnenolone 3-monosulphate, transdehydroisoandrosterone 3-monosulphate, and mixtures thereof. The steroid 3-monosulphates may be prepared synthetically by methods known in the art or may be obtained by suitable isolation processes from the concentrates containing the steroid sulphates derived from natural sources, for example, a concentrate containing the oestrogenic conjugates of equine urine as disclosed in U. S. Patent 2,429,398.

It has been found that certain of the steroid 3-monosulphates, for example, sodium oestrone 3-monosulphate, sodium equilin 3-monosulphate, and sodium equilenin 3-monosulphate are not stable upon prolonged exposure to atmospheric conditions and in this form are not satisfactory for oral oestrogenic therapy. Furthermore, in many instances it is advisable in the treatment of the menopausal syndrome in humans to augment oestrogen therapy by the use of substances possessing tonic and central stimulating properties.

However, it has been found in accordance with the present invention that the new salts of 1-phenyl-propane derivatives having a basic substituent in position-2 with the 3-monosulphates of naturally occurring oestrogens of the cyclopentanopolyhydrophenanthrene series, possess desired properties since they have been found to be stable upon prolonged exposure to the atmosphere and to provide new and useful compounds effective orally in conditions requiring oestrogen therapy and that of the tonic and central stimulating effects of the basic 1-phenyl-propane component.

Similarly the stable salts of 1-phenyl-propane derivatives having a basic substituent in position-2 with pregnenolone 3-monosulphate have been prepared, said salts possessing the central stimulating properties of the base and the antirheumatoid properties of the pregnenolone.

The addition salts of the present invention can be prepared by adding an aqueous solution containing a soluble salt of a basically substituted 1-phenyl-propane of the general formula:

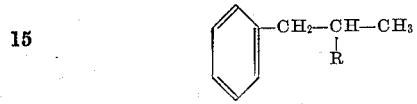

wherein R is a radical selected from the group consisting of free amino and alkyl amino to an aqueous solution containing a soluble salt of the steroid 3-monosulphate and separating off the insoluble product formed and drying this to obtain the desired addition salts as an amorphous solid.

The basically substituted 1-phenyl-propane salts which are used in accordance with the present invention are preferably the water-soluble salts, for example, the sulphates or the hydrochlorides.

EXAMPLES

The following specific examples of the preparation of the product of the present invention are to be taken as illustrative only and not as limiting the scope of the invention.

Example 1

To a solution of 0.39 g. of sodium oestrone sulphate in 6 ml. of distilled water, a solution of 0.23 g. of 1-phenyl-2-amino propane sulphate, in 5 ml. of distilled water, was added at room temperature. There was an instantaneous precipitation of 1-phenyl-2-amino propane oestrone sulphate. The mixture was thoroughly agitated, chilled in an ice bath for 30 minutes and finally extracted twice with chloroform. The aqueous phase was separated and discarded and the chloroform extract was washed twice with water then filtered and evaporated under reduced pressure at 35° C. 1-phenyl-2-amino propane oestrone sulphate was obtained as a white amorphous powder and was finally dried over phosphorus pentoxide in vacuum.

A specimen, prepared as described above melted at 86 to 88° C. and gave the following figures on analysis:

$C_{27}H_{35}O_5SN$ requires:
C, 66.8; H, 7.23; N, 2.88; S, 6.60%
Found: 66.5; 7.07; 3.06; 6.55%
66.37; 7.26; 3.13; 6.60%

Found 54% of oestrone as determined by the Marrian-Kober test. ($C_{27}H_{35}O_5SN$ requires 55.6% oestrone.)

Example 2

To a solution of 0.40 g. of sodium equilin sulphate in 5 cc. of distilled water, a solution of 0.25 g. of 1-phenyl-2-aminopropane sulphate in 5 ml. of distilled water was added and the mixture agitated and chilled in an ice bath for 30 minutes. An oily precipitate of 1-phenyl-2-aminopropane equilin sulphate separated and was extracted in chloroform. The chloroform extract was washed twice with water then filtered and evaporated to dryness under reduced pressure at 35° C. 1-phenyl-2-aminopropane equilin sulphate was obtained as a white amorphous powder.

One preparation of 1-phenyl-2-aminopropane equilin sulphate prepared by the above procedure melted at 80 to 95° C. and gave the following results on analysis:

$C_{27}H_{35}O_5SN$ requires: N, 2.90% S, 6.63%
Found: 2.87% 6.14%
2.94% 6.16%

The compound contained the expected equilin content as determined by the Marrian-Kober test.

Example 3

To a solution of 0.40 g. of sodium equilenin sulphate in 5 cc. of distilled water, a solution of 0.25 g. of 1-phenyl-2-aminopropane sulphate in 5 ml. of distilled water was added and the mixture agitated and chilled in an ice bath for 30 minutes. The precipitate of 1-phenyl-2-aminopropane equilenin sulphate which separated was extracted in chloroform and the chloroform extract filtered and evaporated under reduced pressure in the usual manner. 1-phenyl-2-aminopropane equilenin sulphate was obtained as a colourless amorphous powder.

Example 4

To an aqueous concentrate containing the water-soluble conjugated oestrogens (isolated from pregnant mares' urine in accordance with U. S. Patent 2,493,358 and containing oestrogens approximately equivalent to 0.10 g. of sodium oestrone sulphate as determined by the Marrian-Kober test) was added a solution of 0.25 g. of 1-phenyl-2-aminopropane sulphate in 5 ml. of distilled water. An oily precipitate formed instantaneously and was chilled for 30 minutes in an ice bath then extracted in chloroform. The chloroform was washed three times with water then filtered and evaporated to dryness under reduced pressure at 35° C. The residual material was finally dried in vacuo over phosphorous pentoxide and the addition salt of the 1-phenyl-2-aminopropane with the oestrogenic conjugates was obtained as a buff-coloured powder.

Example 5

To a solution of 0.39 g. of sodium oestrone sulphate in 6 ml. of distilled water a solution of 0.23 g. of 1-phenyl-2-aminopropane sulphate in 5 ml. of distilled water was added and the mixture agitated and chilled in an ice bath. The supernatant liquid was decanted from the oily precipitate and the latter washed with 5 ml. of distilled water at 50° C. then chilled for 30 minutes in an ice bath and the water decanted. This washing was repeated with a further 5 cc. of distilled water and the damp product drained as efficiently as possible and dried in a vacuum desiccator. 1-phenyl-2-aminopropane oestrone sulphate was obtained as a white powder.

Example 6

44 ml. of pyridine were cautiously added with cooling to a solution of 1.40 ml. of chlorosulphonic acid in 88 ml. of chloroform and the resulting suspension poured into a solution of 5 g. of oestrone in 88 ml. of pyridine and 175 ml. of chloroform. The mixture was kept for 24 hours under anhydrous conditions then concentrated under reduced pressure and washed with ether.

The ether was decanted and the insoluble residue dissolved in 700 ml. of distilled water and the resulting solution shaken with a little activated charcoal, filtered and added to a solution of 4.2 g. of 1-phenyl-2-aminopropane sulphate in 50 ml. of distilled water; there was an instantaneous precipitation of 1-phenyl-2-aminopropane oestrone sulphate. The product was extracted in chloroform and the filtered chloroform extract evaporated under reduced pressure at 35° C. 1-phenyl-2-aminopropane oestrone sulphate was obtained as a white amorphous powder and in excellent yield.

Example 7

To a solution of 0.39 g. of sodium transdehydroisoandrosterone sulphate in 6 ml. of distilled water a solution of 1-phenyl-2-aminopropane sulphate in 5 ml. of distilled water was added. The precipitate of 1-phenyl-2-aminopropane transdehydroisoandrosterone sulphate separated and was collected, washed with water, and dried.

Example 8

To a solution of 0.42 g. of sodium pregnenolone sulphate in water, a solution of 0.23 g. of 1-phenyl-2-aminopropane sulphate in 3 ml. of distilled water, was added. There was an instantaneous precipitation of 1-phenyl-2-aminopropane pregnenolone sulphate which was separated, washed with water and finally dried in vacuum, over phosphorus pentoxide.

Example 9

To a solution of 0.24 g. of sodium oestrone sulphate in 5 ml. of distilled water, a solution of 0.10 g. of 1-phenyl-2-methylamino propane hydrochloride in 2 ml. of distilled water, was added at room temperature. There was instantaneous precipitation of 1-phenyl-2-methylamino propane oestrone sulphate. The mixture was thoroughly agitated, chilled in an ice bath for 30 minutes and finally extracted twice with chloroform. The aqueous phase was separated and discarded and the chloroform extract was washed twice with water, then filtered and evaporated under reduced pressure at 35° C. 1-phenyl-2-methylamino propane oestrone sulphate was obtained as a white amorphous powder and was finally dried over phosphorus pentoxide in vacuum.

Example 10

To a solution of 0.39 g. of sodium oestradiol sulphate in 6 ml. of distilled water, a solution of 0.23 g. of 1-phenyl-2-aminopropane sulphate, in 5 ml.

of distilled water, was added at room temperature. There was an instantaneous precipitation of 1-phenyl-2-aminopropane oestradiol sulphate. The mixture was thoroughly agitated, chilled in an ice bath for 30 minutes and finally extracted twice with chloroform. The aqueous phase was separated and discarded and the chloroform extract was washed twice with water then filtered and evaporated under reduced pressure at 35° C. 1-phenyl-2-amino propane oestradiol sulphate was obtained as a white amorphous powder and was finally dried over phosphorous pentoxide in vacuum.

We claim:

1. As a new compound, the stable addition salts having central stimulating activity and other therapeutic activity and corresponding to the formula:

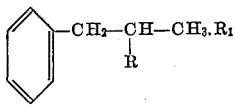

wherein R is selected from the group consisting of amino and alkyl amino and $R_1$ is a therapeutically active steroid 3-monosulphate.

2. As a new compound, the addition salt having central stimulating activity and other therapeutic activity and corresponding to the formula:

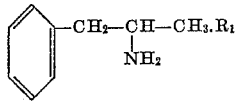

wherein $R_1$ is a steroid 3-monosulphate.

3. As a new compound, the addition salt having central stimulating activity and other therapeutic activity and corresponding to the formula:

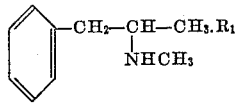

wherein $R_1$ is a steroid 3-monosulphate.

4. As a new compound, the 1-phenyl-2-aminopropane oestrone 3-monosulphate.

5. As a new compound, the 1-phenyl-2-aminopropane equilin 3-monosulphate

6. As a new compound, the 1-phenyl-2-aminopropane equilenin 3-monosulphate.

7. As a new compound, the addition salt of 1-phenyl-2-aminopropane with the oestrogenic conjugates from unhydrolyzed pregnant mares' urine.

8. A process for the preparation of stable addition salts possessing central stimulating activity and other therapeutic activity and having the general formula:

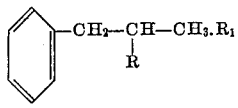

wherein R is a radical selected from the group consisting of amino and alkyl amino and $R_1$ is a therapeutically active steroid 3-monosulphate comprising combining in solution a basically substituted 1-phenyl-propane derivative of the general formula:

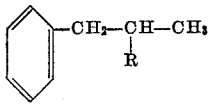

wherein R is as defined above, with a therapeutically active steroid 3-monosulphate to form an addition salt and separating said addition salt from the reaction mixture.

9. A process for preparing stable addition salts as defined in claim 8, in which R stands for amino and the steroid 3-monosulphate is selected from the group consisting of oestrone 3-monosulphate, equilin 3-monosulphate, equilenin 3-monosulphate and oestradiol 3-monosulphate.

10. A process for preparing stable addition salts as defined in claim 8, in which R is a methylamino radical and the steroid 3-monosulphate is selected from the group consisting of oestrone 3-monosulphate, equilin 3-monosulphate, equilenin 3-monosulphate and oestradiol 3-monosulphate.

11. A process as defined in claim 8, in which $R_1$ is transdehydroisoandrosterone 3-monosulphate.

12. A process as defined in claim 8, in which $R_1$ is pregnenolone 3-monosulphate.

13. A process as defined in claim 8, in which $R_1$ is a concentrate of the oestrogenic conjugates of unhydrolyzed pregnant mares' urine.

GORDON ALLISON GRANT.
WILLIAM LAWRENCE GLEN.
RICHARD JAMES BARBER.

No references cited.